2,863,771
PRODUCTION OF DRY, VITAL GLUTEN

Peter J. Ferrara, New York, N. Y.

No Drawing. Application December 16, 1955
Serial No. 553,438

6 Claims. (Cl. 99—14)

In the preparation of flour from wheat, the wheat is ground and separated in steps into a number of fractions, such as a bran, a so-called clears, and a so-called patent flour. Both the clears and the so-called patent flour contain starch and gluten. The starch and gluten are separable from one another by a process which involves the addition of sufficient water to form a dough under controlled conditions of temperature. This causes the gluten to hydrate and become cohesive, permitting the mechanical manipulation of this dough in the presence of additional water. This manipulation progressively releases the minute particles of starch which now become dispersed in the wash water, leaving the gluten in the form of an elastic mass. Numerous mechanical expedients for carrying out the manipulation are known to the prior art.

The wet gluten so produced is ordinarily dried for shipment into commerce. Drying the gluten does not appear to destroy its food value or to reduce its value for certain purposes, such as the production of sodium glutamate. As heretofore practiced, the drying of the gluten has resulted in a substantial decrease in the characteristics of the gluten protein, so that, when it is added to flour to attain higher levels of protein, the desired improvement in baking strength, texture and appearance is not obtained. Such gluten is termed devitalized in contradistinction to gluten which has not been so degraded and may therefore be referred to as vital gluten.

In the saccharification, fermentation and distillation of starches derived from cereals for the production of ethyl alcohol or other products of fermentation, the starch component is the essential material. For this reason if the starch is derived from wheat flour, the starch and gluten may first be separated, resulting in a starch that is more suited to the requirements of the distillation industry, and a gluten product which is available for other uses. Much of the wheat grown in Continental Europe and is certain areas of the United States is low in gluten protein and the flour produced from these types of wheat would be benefited by the addition of wheat gluten from other sources if this were done with an increase in the desirable properties of the bread or other baked products made therefrom. Vital gluten has been produced experimentally from the said wet gluten by freezing the same, and while still frozen, evaporating the moisture under high vacuum. The drying is followed by a grinding operation to produce particle sizes suitable to blending with flour. This is, however, a very slow process and offers poor economics for commercial production. Some commercial gluten is currently produced by vacuum drying, drum drying, etc., and while such gluten is referred to as vital gluten, the gluten product has, at least in part, lost valuable properties.

I have found, however, that a vital gluten may be produced from the said wet gluten by dispersing it in water to form a fine suspension, and while so suspended, passing it in contact with heated air or other gas so that the product temperature does not exceed 110–120° C., provided the drying operation is completed within a few seconds and not exceeding five seconds. These conditions can be made to obtain in a spray dryer provided the final temperature of the gluten is not permitted to rise over about 120° C. This method of drying is not, however, economically feasible at present owing to the large volume of water in relation to the wet gluten that is required to form such a suspension with the peptizing agents heretofore known. With the gluten derived from the lower grades of flour, such as wheat clears, the amount of gluten which can be dispersed in a given mass of water with the peptizing agents heretofore known, is even lower. I have found, however, that dispersions of the wet gluten, containing from 10 to about 21% by weight of the gluten solids can be achieved by mixing the wet gluten in contact with formic acid solutions of a pH range of from 2–4.5. The preferred pH range is from 2.5–4. These dispersions are easily produced by a gentle manipulation of the wet gluten in contact with the acid solution. They are stable, free flowing and easily transferable by pump or pressure. They are stable against the action of proteolytic enzymes and other micro-organisms. Even after standing for as long as 72 hours at temperatures of around 20° C. and then dried in the manner hereinabove described, the dried gluten produced is vital.

With increasing amounts of gluten passing into the dispersed form, the initial pH of the acid tends to rise toward the upper limit specified, or even outside of this limit. This effect can be overcome by the progressive addition of fresh formic acid, but is preferably inhibited by starting with a solution of formic acid within the pH range specified, containing alkali metal formate. The alkali metal formate appears to act as a buffering agent to release hyrogen ions and thereby maintain a lower pH than could be maintained by the free acid alone. For this reason with higher initial pH, more sodium formate is required to hold the pH of the dispersion within the prescribed range. In general, the mol ratio of sodium formate to formic acid ranges from 1:1 to 1:15. The larger ratios of sodium formate in relation to the formic acid specified are recommended where the initial pH is numerically about 3.5 or higher, and the lower ratio of sodium formate to formic acid is recommended where the initial pH is numerically lower, i. e., from 2 to about 3.

Example 1

As a practical example of the application of my process, the starting material was a so-called patent flour derived from a hard winter wheat. This contained 12.9% protein and 0.49% ash. It was separated in a manner referred to hereinabove into a starch suspension and a residual mass of wet gluten. 1.2 parts of the wet gluten containing 35.3% gluten, dry basis, was gently mixed in contact with 1.0 part of 0.005 Normal formic acid solution, with an initial pH of 3.0. After a few minutes of gentle mixing both formic acid and the wet gluten had resolved themselves in a homogeneous, free-flowing dispersion. The pH had increased gradually to about 4.4. The dispersion so made, containing 19.3% by weight of gluten, dry basis, was spray-dried in contact with moving air at a maximum temperature of about 110° C. The drying operation was completed in 2.7 seconds. The dry gluten so produced was then tested by adding to grades of flour that were deficient in good baking quality, and from the flour so fortified, producing an excellent grade of baked bread, comparable in all respects with a bread produced from a flour naturally containing the same level of protein.

Example 2

As a second practical example, a starting material was a so-called clears containing 17% protein and 0.78% ash derived from a hard spring wheat. This was separated into a starch dispersion and a residual wet gluten. 1.03 parts of the wet gluten containing 34.0 parts by weight of the gluten, dry basis, were gently mixed in contact with 1.0 part of a 0.057 Normal formic acid solution, buffered with sodium formate to an initial pH of 2.5. This solution was made by mixing 100 grams of 90% formic acid with 9 grams of sodium formate and diluting the solution to a total volume of one litre. After several minutes of gently mixing the gluten in contact with the solution, both gluten and solution had resolved themselves into a homogeneous, stable, free-flowing dispersion. Notwithstanding the fact that the gluten was made from a high ash flour and would therefore have been extremely difficult to disperse, using prior art procedures, the dispersion contained 17.3% by weight of gluten, dry basis.

The dispersion so made was dried in a spray-drier. The maximum temperature of the gluten while being dried was maintained at about 112° C. and the drying was completed in 2.4 seconds. The dry gluten so produced was tested by incorporating it with grades of flour that were deficient in good baking quality and using the grade of flour so fortified in the production of breads. The breads so produced were comparable in baking strength, texture, color and appearance with breads produced from flour having the same level of protein initially.

I claim:

1. Method of making a stable aqueous dispersion of wet gluten derived from wheat flour, which comprises admixing such wheat gluten with an aqueous solution of formic acid of from 2-4.5 pH.

2. Method according to claim 1 in which said aqueous solution is from 2.5-4.0 pH.

3. Method of producing a dry vital gluten from wet gluten derived from wheat flour, which comprises forming a stable dispersion of such wet gluten by admixing it with an aqueous solution of formic acid of from 2-4.5 pH, thereby forming a homogeneous aqueous dispersion and drying said dispersion by dispersing it in the form of droplets into contact with heated air, thereby heating it to a temperature not exceeding 120° C., said drying being completed within 5 seconds.

4. Method of making a stable aqueous dispersion of wet gluten derived from wheat flour, which comprises admixing such wheat gluten with an aqueous solution of formic acid of from 2-4.5 pH containing an alkali metal formate in the mol ratio of from 1 sodium formate : 15 formic acid to 1 sodium formate : 1 formic acid.

5. Method of producing a dry vital gluten from wet gluten derived from wheat flour, which comprises forming a stable dispersion of such wet gluten by admixing it with an aqueous solution of formic acid of from 2-4.5 pH containing alkali metal formate, thereby forming a homogeneous aqueous dispersion and drying said dispersion by dispersing it in the form of droplets into contact with heated air, thereby heating it to a temperature not exceeding 120° C., said drying being completed within 5 seconds.

6. Method of producing a dry vital gluten from wet gluten derived from wheat flour, which comprises forming a stable dispersion of such wet gluten by admixing it with an aqueous solution of formic acid containing sodium formate in the mol ratio limits of from 1 sodium formate : 1 formic acid to 1 sodium formate : 15 formic acid, said aqueous solution having a pH of from 2-4.5, thereby forming a homogeneous aqueous dispersion and drying said dispersion by dispersing it in the form of droplets into contact with heated air, thereby heating it to a temperature not exceeding 120° C., said drying being completed within 5 seconds.

References Cited in the file of this patent

UNITED STATES PATENTS

| | | |
|---|---|---|
| 2,158,499 | Grassmann et al. | May 16, 1939 |
| 2,560,011 | Trudel | July 10, 1951 |

OTHER REFERENCES

"The Chemical Senses," by Moncrieff, Leonard Hill Limited, 17 Stratford Place, W. 1, London, 1944, page 185.

"Cereal Chemistry," vol. 27 (1950), pp. 186-8.

Serial No. 307,337, Nyrop (A. P. C.), published May 4, 1943.